United States Patent [19]

May et al.

[11] 3,896,292

[45] July 22, 1975

[54] HALL EFFECT POSITION CODED CARD DETECTOR

[75] Inventors: Michael May; Melvin M. English, both of Los Angeles, Calif.

[73] Assignees: Michael May; Melvin M. English, both of Los Angeles, Calif.

[22] Filed: June 18, 1973

[21] Appl. No.: 371,063

[52] U.S. Cl. ................ 235/61.11 D; 235/61.12 M; 340/174 HA

[51] Int. Cl.[2] .......................................... G06K 7/08

[58] Field of Search.......... 235/61.11 D, 61.12 M, 235/61.12 R; 340/174 HA, 174 EB, 174 SP

[56] References Cited

UNITED STATES PATENTS

| | | | |
|---|---|---|---|
| 2,828,396 | 3/1958 | Forman et al. | 340/174 EB |
| 3,418,119 | 12/1968 | Schwartz et al. | 235/61.12 R |
| 3,508,032 | 4/1970 | MacDuffee et al. | 235/61.11 D |
| 3,634,657 | 1/1972 | Ballard et al. | 235/61.11 D |
| 3,683,340 | 8/1972 | Dorsch et al. | 340/174 HA |
| 3,701,126 | 10/1972 | Reichard | 340/174 HA |

OTHER PUBLICATIONS

IBM Tech. Disc. Bull. "Hall Effect Credit Card Reader" by Strad; Vol. 14, No. 4, Sept. 1971, p. 1049.

*Primary Examiner*—Stanley M. Urynowicz, Jr.
*Attorney, Agent, or Firm*—Donald C. Keaveney

[57] ABSTRACT

There is disclosed a position coded key card and a detector therefor which uses Hall effect sensors and which is suitable for use in operating vending or service machines, gates, banking or security systems, or the like to achieve maximum security against counterfeiting or false code operation at minimum cost. The device uses a plurality of Hall effect two terminal magnetoresistors each of which is connected as a sensor in a signal producing circuit which includes the resistor and a transistor which is turned on or off by changes in the value of the resistance to produce changes in voltage levels at the transistor output. Such changes are produced by the presence or absence of a piece of high permeability material such as steel embedded at selected code positions in a plastic card which is locked in reading position in a card receiving means with which the sensors are associated. The signals produced by the Hall effect sensors and transistors are supplied to logic circuitry which includes the functions of an "A and not B" gate (A · B) as a false code detector. The logic circuit gate produces an output when only when a predetermined signal level is present at a preselected one of its two inputs and is absent at the other of its two inputs. Such a signal pattern can result only from having a piece of steel in the card present in mating relationship to one of the sensors and not having a piece of steel or an entire steel card present at the other of the sensors. The absence of a high permeability path formed by material such as steel at one of the sensors precludes tripping of the gate by a counterfeit card formed entirely of steel or other high permeability material. The device thus permits the use of simplified sensors to achieve a high degree of security by sensing the precise location of even one piece of embedded steel in logical combination with the false code detector. More complex logic and information storage functions can also be used where warranted.

15 Claims, 11 Drawing Figures

HALL EFFECT POSITION CODED CARD DETECTOR

BACKGROUND OF THE INVENTION

1. Field of the Invention

This invention relates to a position coded key card and a detector or reader for the card which functions by sensing a code defined by variations of a characteristic of the material of the card, such as its magnetic permeability, as a function of position on the card in order to identify a code and thereby actuate a utilization circuit.

2. Description of the Prior Art

A number of key card readers or detectors for various purposes have in the past been developed. In general the more security they have achieved, the greater their cost and complexity has been. Typical illustrations of such systems are found in the following U.S. Pats.: O'Gorman No. 3,154,761; Ryno No. 3,274,352; Ten Eyck No. 3,465,131 and Cooper No. 3,564,214. O'Gorman uses electromagnets to sense magnetized material within a pass card. Ryno uses magnetic reed switches to detect selectively positioned flux diverting metal pieces embedded in a plastic card. Ten Eyck uses a plastic card having a metal strip sandwiched throughout the card except for portions where holes are punched in the hidden metal strip to provide a change in the magnetic flux diverting characteristics of the card at the hole positions. These positions are then sensed by magnetically actuated reed switches. Cooper uses copper discs embedded in a card of opaque material and has a reader containing opposed electromagnetic coils to sense the presence or absence of the copper discs at locations which mate with the coils.

In each of these systems the problem of complexity and cost versus security noted above may be observed. Electromagnetic coils are relatively expensive and require the isolation or insulation of a line voltage circuit. Reed switches or other moving magnetic members or devices have problems not only of cost but also of reliability and lifetime functioning inherent in any circuit element having moving parts. Sensors for a card which itself contains a magnetized material or a permanent magnet are inherently expensive as is the card itself. A similar expense consideration applies to cards one or more layers of which are primarily or entirely composed of metallic as against plastic materials. Such cards are too expensive to be disposable. In applications where the card may be used for low cost services such as operation of a washing machine or the like, consideration of saving a fraction of a cent on cards which must be used a once and recycled in very high volume are significant. In applications requiring a high degree of security the best ultimate insurance against counterfeiting no matter what coding or detecting system is used is the practical ability to quickly change codes and reissue cards in high volume at low cost. In thses or in any application, the low cost and high reliability of a detector or sensor using simple solid state circuitry having no moving parts other than mechanically actuated switches and operating at low voltages are advantages of considerable significance.

Such a low cost, high security and high reliability system is achieved by using two terminal Hall effect magnetoresistors as sensing heads and changing the bias field through these resistors provided by a permanent magnet in the detector by the presence of small bits of accurately placed metal in a plastic card. The prior art has made some attempt to use four terminal Hall effect devices in sensors for such cards, but these suffer from the fact that they require separate driving and sensing circuits and that the signal produced is a voltage at a level which normally must be amplified in order to be sensed. Typical of prior art attempts to use such four terminal Hall effect devices are the following U.S. Pats.: Kuhrt No. 3,179,856; Burig No. 3,195,043; Rittmann No. 3,660,696; and Ballard No. 3,634,657.

Kuhrt and Burig both relate to the general purpose signal transmitting and metallic proximity detection functions of Hall effect sensors and are not specifically directed to key card devices. Burig in particular illustrated the complexity of electronic circuitry necessary for utlizing such four terminal devices in any kind of metal detection scheme. Rittmann relates generally to a Hall effect switching circuit and shows some simplification of the associated circuitry. Ballard uses four terminal Hall effect devices to detect a pattern of permanent magnets in a coded card such as a credit card, a key card or the like. The cost and complexity of such a device is increased both by the use of permanent magnets in the card and by the use of the four terminal Hall effect circuitry.

All of the above discussed prior art systems (and particularly those using magnets in the card) contemplate sensor arrangements which do not require very precise positioning of the card since the element or magnetic field being sensed is relatively large and the matching or allignment problem is not limited by critical tolerances. Hence none of these systems provide anything more than very rough guide means for receiving the card. No locking means are provided for positioning the card precisely and no circuitry is provided for detecting a false code or an attempt to actuate the device by a simple sheet of metal, magnetized or unmagnetized.

Two terminal magnetoresistive devices have been used in the prior art for various other applications and are, for example, manufactured by Siemens, a corporation of Germany having offices in Berlin. The general nature of these devices and their circuit application has been described in an article in "EDN/EEE" in the issue of Jan. 15, 1972. This periodical is a Cahners publication including "Electronic Design News" and may be obtained from the publisher at 270 St.Paul St., Denver, Colo. 80206. The article noted was written by Klaus Behr, a U.S. sales representative for Siemens components.

Such magnetoresistors are semiconductor devices that increase their resistivity in a magnetic field. They have become popular especially in Europe because they are two terminal replacements for the four terminal Hall effect devices and because they can produce the right level of resistance variation for use in solid state circuits. They will produce one volt signal swings in elementary bridge circuits or the like when subjected to fields produced by inexpensive permanent magnets. Since they are two terminal devices, they can replace regular resistors almost anywhere in a low voltage solid state circuit. They cost about one dollar each. Magnetoresistors increase their resistance when a perpendicular magnetic field is applied because the lateral Lorentz force of the field upon the current squeezes the carriers to one side, narrowing the effective cross section. The effect can be enhanced and the sensitivity of the resistor to changing fields increased by embedding many small metal needles in the semiconductor crosswise to the current flow. The resulting zig-zag path effectively greatly increases the length of the resistor and hence its sensitivity as explained in detail in the above noted article. Such magnetoresistors have been used to drive transistor circuitry for various other purposes, but no prior application thereof to key card or other code sensing circuits or devices is known.

SUMMARY OF THE INVENTION

The present invention obtains maximum security against counterfeiting or false actuation at minimum cost by using two or more two terminal Hall magnetoresistors each biased with a permanent magnet and each functioning as a sensor to detect a small magnetizable piece of steel or other high permeability metal embedded in a plastic card which may be the size of a credit card, a ticket, or the like. Card receiving means are provided in the detector to snugly receive the card. A spring actuated plunger is provided to seat in a hole in the card and lock it in position when it has reached the intended or correct reading position in the card receiving means of the reader so that the sensors mate with the preselected position code locations on the card. The resulting change or lack of change of resistance in the magnetoresistors is used to control transistors in logic gate circuitry to detect a discreet combination of positions which corresponds to the predetermined code and to actuate a utilization circuit when the card has been locked in the correct position and the correct code has been sensed. In applications such as operation of washing machines or other vending or service devices, the plunger is so shaped that the card can be pushed on through the receiving and reading means after being locked therein but cannot be retracted. The cardscan then be sold at a predetermined price with the assurance that they can only be used once in lieu of cash. The collection of cards in place of change in a situation where coin operated vending or service machines might otherwise be used provides a large degree of safety against the theft and vandalism which has in the past plagued such apparatus and is made possible by the achievement of low cost cards having high security against counterfeitability. Furthermore, when efforts at counterfeiting the cards or tickets are suspected, the code on the machine of the present invention can readily be changed by a simple change in either the sensor position or in the logic circuitry so that new cards can be issued and exchanged for those outstanding.

The precise positioning required to actuate the device of the present invention also adds to the security of operation. In one exemplary embodiment the card must be positioned within a sixteenth of an inch of its intended position in order to be operative. The circuitry of present invention is such that not only can the card not be withdrawn in a preferred embodiment, but also it will only be readable and an output signal obtainable when the card is exactly locked in its intended position. The plunger thus serves not only as a locking but also as a card positioning device and adds another logical dimension to the code while the logic gate and false code detector circuitry provide security against actuation of the device by simple insertion of plain sheet of metal. If desired the plunger can be shaped to permit retrieval and reuse of the card.

BRIEF DESCRIPTION OF THE DRAWINGS

These and other features and advantages of the invention will be more fully understood from the following description taken in connection with the accompanying drawings in which like reference characters refer to like parts throughout and wherein.

Figures 1, 2:
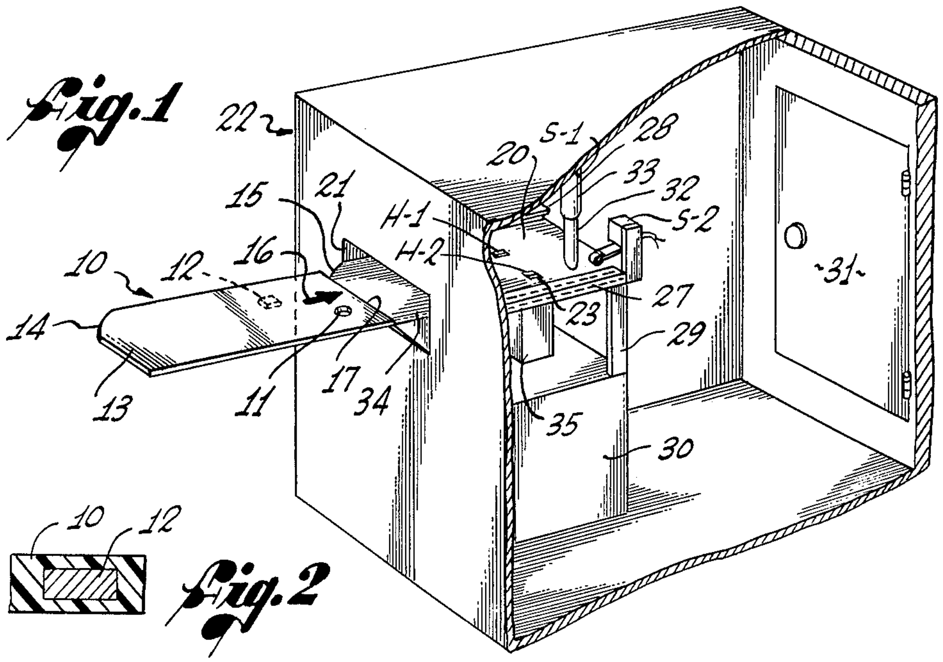
FIG. 1 is a perspective view, partly broken away, of a coded key card and a detector device therefor.
FIG. 2 is a fragmentary sectional view through the card of FIG. 1.

FIG. **4*a* is a sectional view of a locking plunger in the detector of FIG. 1**.

Figure 4A:
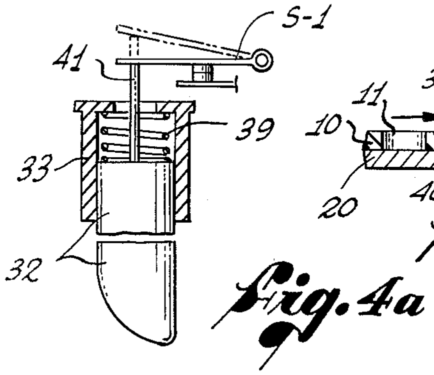

FIGS. **4*b* and 4*c* are fragmentary sectional views illustrating the operation of the plunger in FIG. 4*a*** as the card is inserted into the card receiving means and locked therein by the plunger.

Figure 5:
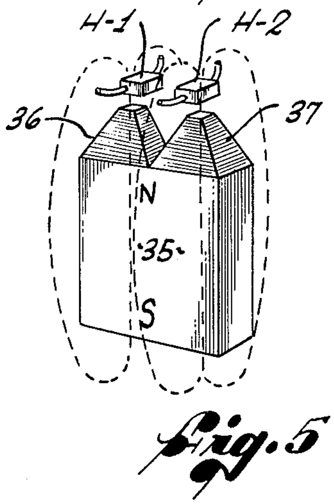
Figure 3:
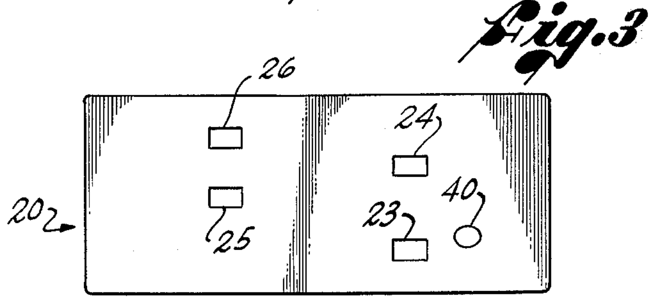
FIG. 3 is a plan view of the card receiving plate member in the detector of FIG. 1.

FIG. 5 is a perspective view, partially exploded, of the magnetoresistor sensors and the permanent magnet biasing means on which they are mounted.

Figure 6:
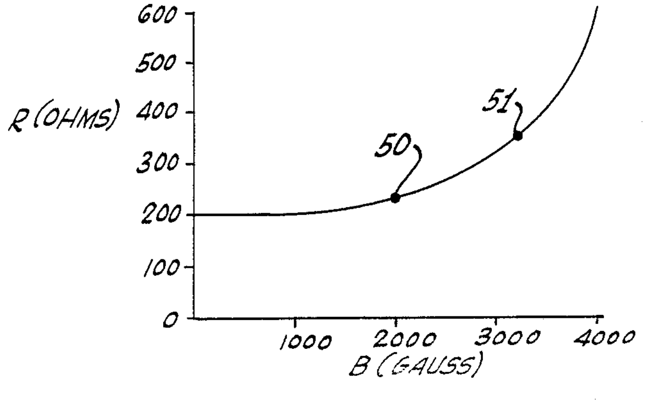

FIG. 6 is a graph showing the resistance, R, as a function of the flux density, B, for the magnetoresistors of FIG. 5.

Figure 7:
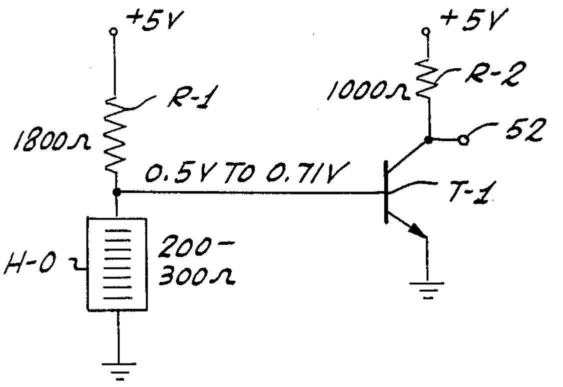

FIG. 7 is a circuit diagram illustrating the manner in which a magnetoresistor may be used to directly control a transistor.

Figure 8:
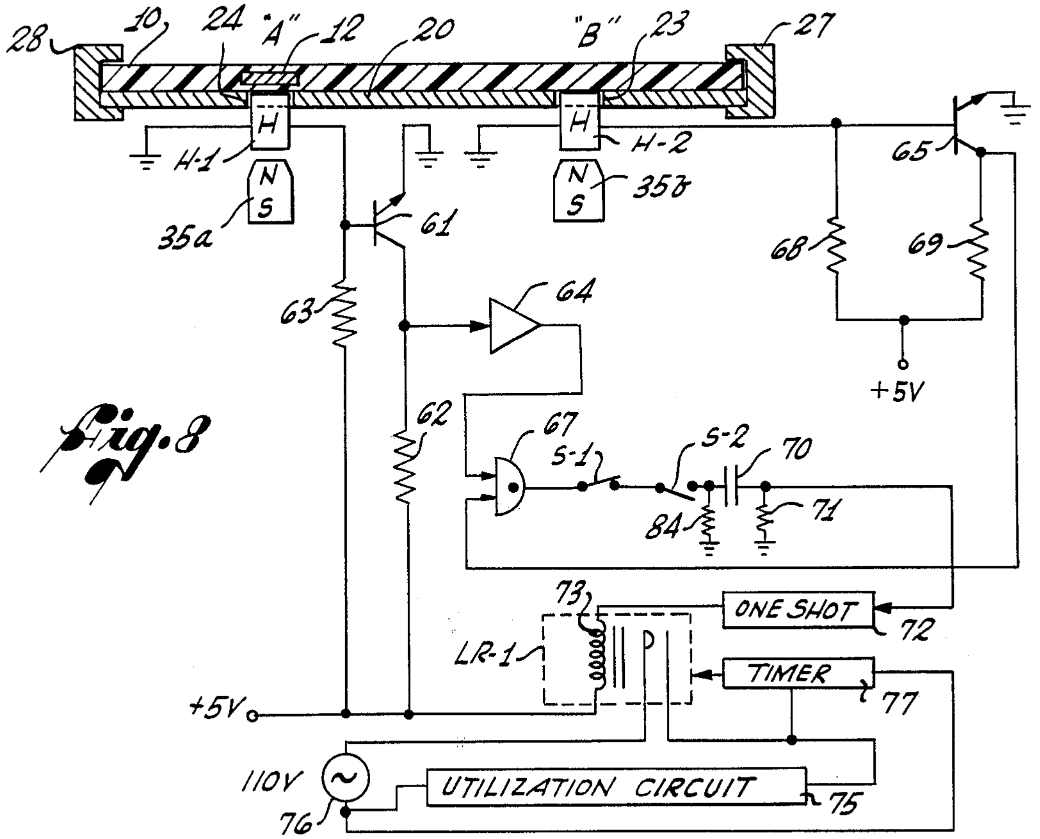

FIG. 8 is a circuit diagram of the detector of FIG. 1 schematically showing the card positioned on the reading plate under which the magnetoresistor sensors are located.

Figure 9:
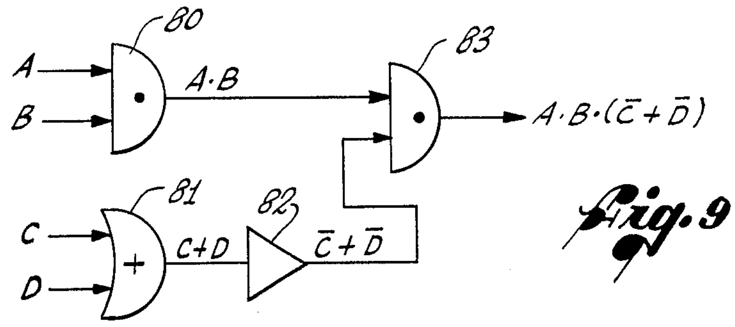

FIG. 9 is a logic circuit diagram illustrating an alternate logic gate circuit which may be used in the circuit of FIG. 8.

DESCRIPTION OF ILLUSTRATIVE EMBODIMENTS

Referring now to FIGS. 1 through 5 there is shown a card or ticket 10 which is shaped and dimensioned to be snugly received in mating relationship with and on a card reading plate 20 which extends inwardly from the slot 21 in the card detector housing 22. Reading plate 20 is preferably formed of a nonmagnetic metal such as aluminum or brass and is provided with slots such as the slots 23, 24, 25 and 26 beneath which the magnetoresistor sensors are positioned in accordance with a code pattern.

Reading plate 20 is provided with edge guide members 27 and 28 which may also have grooves at the bottom thereof to snugly receive the card 10. If grooves are not provided, spring fingers or other means (not shown) may be used to securely position the card 10 in contact with the reading plate 20. Plate 20 is attached at one end to the inside of the housing 22 at a point such that it is alligned with a lip or flange 34 extending outwardly from the slot 21 in housing 22. The other end of plate 20 is supported by posts such as post 29 extending upwardly from the top surface of an interior housing 30 which serves to enclose and protect the electronic components of the circuitry to be described hereinafter. The rest of the interior of housing 22 conveniently forms a receiving bin to collect the tickets 10 after they have been used in applications where single use of a non-returnable ticket is contemplated. A lockable door 31 is provided at the rear of housing 22 so that the operator of the apparatus may gain access thereto either to collect the tickets which have been used or to change the code setting in a manner to be described below.

Figure 4B:
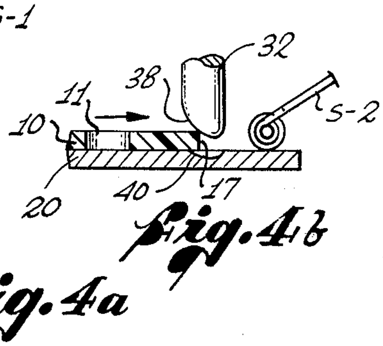

Spring actuated piston or plunger 32 is slideably received in a cylinder 33 in which the plunger actuating spring 39 is contained as shown in FIG. 4*a*. Cylinder 33 is mounted to the underside of the top surface of housing 22 in any convenient manner such as by a depending bracket not seen in the drawing. The plunger and cylinder are preferably mounted in fixed position above the reading plate 20 so that when the card is inserted through slot 21 onto the reading plate the plunger will seat in hole 11 in card 10 as seen in FIGS. 4*a* and 4*b*. If it is desired to use the position of the plunger 32 and hole 11 as one variable element of the key coding, the mounting bracket may be provided with means for adjusting the position of the plunger relative to the surface of the reading plate 20. It is normally preferred, however, to provide a fixed mounting for the plunger and to vary the position of the magnetoresistors to change the code as will be described below.

It should also be noted that in applications where repetitive use of a key card issued only once to a particular owner is contemplated the housing 22 may be dimensioned so as to place the rear surface in which door 31 is now shown directly adjacent the interior end of the reading plate 20 in allignment with which a slot would be provided either in door 31 or in a fixed rear surface. The card 10 could then be inserted in slot 21, read by the device, and pushed on through to exit through a rear slot for retrieval by its owner. Such a mode of operation may be desirable, for example, in gate controlling apparatus or the like. In such applications the locking feature of the plunger is not essential and it may alternatively be modified to permit retrieval of the card either from slot 21 itself or from a rear wall slot.

Even in such repetitive use applications, however, it is preferred to retain the locking plunger and the arrangement of the receiving bin shown in FIG. 1 since the maximum deterrent to counterfeiting any ticket or key arrangement is the ability to issue a large number of cards inexpensively and to thereby be able to afford to retain the option of changing the code in the reader at will and reissuing new cards if any indication of counterfeiting activity is found. This is particularly true if the detector is used to actuate an automatic credit card reading terminal at a point of sale location of a central computer controlled credit system. In such systems it is of course a real convenience for the credit card user to retain his own account number permanently as is now the commercial practice. However, the device of the present invention permits the use of a small auxiliary card or ticket such as shown at 10 which has been issued to all valid account holders to actuate the reading head for the account number. The coding on card 10 can then be changed at will for any group of cards. Alternatively, card 10 itself in addition to the actuation code may contain a binary encoded key number arbitrarily selected and periodically change which is also stored in the central computer at an address permanently identified by the user's credit card account number. Verrification of identity is then achieved by querying the memory location identified by the account number to ascertain by comparison that the currently correct key number is stored therein and corresponds with the number or code embedded in ticket 10. As noted, this latter more simple number can be changed at will, as often as after every transaction if desired, without changing the account number in order to prevent counterfeiting as will be more clearly seen below. The same technique can of course be used in security systems other than those utilizing a conventional credit card.

In whatever system it is used the detector of FIG. 1 is provided with a permanent magnet 35 for generating a magnetic bias field for the magnetoresistor. Tapering generally pyramidal shaped tips or pole pieces 36 and 37 are glued or otherwise attached to magnet 35 as shown in FIG. 5 in order to concentrate the lines of magnetic flux and increase the flux density at the tops of the tips 36 and 37 on which the two terminal magnetoresistor Hall effect sensors H-1 and H-2 are mounted. The paths of magnetic flux through the sensors and their mounting bias magnet are shown only schematically by a single flux line for each of the two. It will of course be understood that in fact the usual field pattern exists. The assembly of permanent magnet 35 with its tips 36 and 37 on which the magnetoresistor sensors H-1 and H-2 are mounted may be provided on its underside with any convenient mounting and locating means such as a standard miniature tube or transistor base to be received in a socket or other mounting means in the top surface of the electronics cabinet housing 30 so as to position the permanent magnet 35 and its associated sensors in correct allignment with the desired holes, such as holes 23 and 24, in reading plate 20. If a plurality of sockets are provided, the position of the magnet can easily be changed in order to change the coding of the device.

In the first embodiment to be described only two of the reading holes 23 and 24 are used and a single magnet 35 is shown for convenience. It will of course be understood, however, that two separate magnets as shown in FIG. 8 at 35*a* and 35*b* may be used if desired. If only two sensors are used the other holes in the plate 25 and 26 are provided for alternate positions to facilitate changing of the code. Of course, magnet mounting means alligned with them are provided in the upper surface of housing 30. It is also noted that plate 20 is separated from lip 34 and is screw mounted in position so that it may be removed and reversed end to end or up and down in order that the asymetically located holes will provide a still further variation in the available coding patterns. Each of these variations is of course provided with a mating mounting position for the bias magnet and sensors assembly associated or potentially associated therewith.

As may be seen in FIG. 1, the holes such as 23 are provided so that the magnetoresistor sensor such as H-2 which is mounted on the top of the magnet tip 37 can protrude upwardly through the hole for substantially direct contact with the card 10 and to achieve correct positioning of the sensors mounted on the movable magnets after any number of changes. Since the plate 20 consists of nonmagnetic material the holes 23, etc., could be omitted altogether if one used other positioning means and is willing to accept the slight loss of sensitivity resulting from the increased distance between the magnetoresistor and the card.

As seen in FIGS. 1 and 2, the card 10 is a sheet of plastic material in which is embedded a small piece 12 of magnetizable matal of high permeability. Metal insert 12 may, for example, be steel. Card 10 has a width equal to the width between the side rails 27 and 28 on reading plate 20 and it has a length equal to the combined length of reading plate 20 and lip 34 so that when the card is fully inserted the portion 13 thereof will extend outside of the housing and mate with lip 34. One end of the portion 13 is rounded as at 14 to match with the rounded end 15 of lip 34 to suggest proper orientation of the card while inserting it. Instructions for use may be printed on the outside of the housing and/or on the card 10. Arrow 16 is printed on the upper surface of card 10 to indicate the direction of insertion of the card in the slot 21 whereas rounded edge 14 mating with rounded edge 15 provides an indication that the side on which arrow 16 is printed should be the up side.

It will be noted that the hole 11 extending through card 10 in which the plunger 32 seats to lock the card in the card receiving means including the card reading plate 20, is asymetrically positioned away from the center line of the card on which arrow 16 is printed. This position of the hole offset from the center line is used to insure that if the card is improperly oriented when it is inserted in the slot (as is possible in spite of the instructional indications) the hole will not mate with the plunger and the card will not be locked in the device. The user may then utilize the portion 13 of the card mating with lip 34 to retract the card for correct insertion.

When card 10 is properly inserted in slot 21 as illustrated in FIGS. 1, *4b* and *4c*, the leading end 17 of card 10 first encounters the rearward edge of plunger 32 which is rounded upwardly as shown at 38. Plunger 32 is biased by spring 39 to normally seat in a small detent 40 in plate 20. In applications where it is desired to retract or retrieve card 10, both the rear and forward edges of plunger 32 are rounded upwardly and only the sides of the plunger are fully effective in positioning the card. In either version, a rod 41 extends upwardly from plunger 32 through the top or side of cylinder 33 to actuate the arm of microswitch S-1. In the normal or spring biased position of the plunger 32 seated in the detent 40 of plate 20, the switch S-1 is closed and is opened by the raising of plunger 32 against the action of spring 39. That is to say, S-1 is a normally closed microswitch the opening of which indicates that the leading edge 17 of card 10 has encountered the rounded portion 38 on the rearward edge of plunger 32 and has been pushed under it to cam up the plunger 32 against the spring action. This phase of the action is illustrated in detail in FIG. *4b*.

As the user continues to insert the card the leading edge 17 advances from left to right as shown in FIGS. *4b* and *4c* until the plunger 32 seats in hole 11 as shown in FIG. *4c*. When the leading edge 17 has projected beyond the location of the detent 40 and plunger 32 it encounters a conventional roller on the arm of a second microswitch S-2 which is mounted on the post 29 supporting the plate 20 and which has its arm positioned to be alligned with the plunger 32 along the line of travel of the hole 11 in card 10. This switch S-2 is biased to a normally open position and is closed by the material of the card underneath it which raises the switch arm. The connection 0f the microswitches S-1 and S-2 in the sensing circuitry is shown in FIG. 8. It will be noted that they are connected series and that both must be closed in order for any output signal to be transmitted from the logic circuit to the actuating circuit.

The microswitch S-1 which is normally closed and is initially opened by the travel of the card and is then reclosed when the card has reached its correct position is provided to preclude spurious transient or other output signals from being generated by the electronic sensors during the latter portion of the travel of the card but before the card has reached the exactly correct position. It thus functions as a position sensing device in that it permits the sensors to provide a reading of the code on the card to actuation circuitry only when the card has been locked in a correct position. Cooperating with S-1 to achieve this function is the switch S-2 which must be raised from the normally open position with the switch arm on plate 20 to the closed position shown in FIG. *4c* with the switch arm on a card 10. Thus when and only when both switches are closed is there an indication that a card has been inserted and correctly positioned.

The switcharm S-2 is located in the line of travel of the hole 11 of card 10 in order that it may also provide a further anti-counterfeiting function. A casual inspection of card 10 will suggest to a would be counterfeiter that the hole indeed is provided to receive some kind of locking member. The most obvious attempt at counterfeiting would therefore be to obtain a single card or ticket 10 sold by the owner of the device at a price contemplating a single use. Once a valid card is obtained the temptation would be strong to convert the hole 11 to a slot by cutting out material between the hole and the end of the card so that one could repetitively use the card and obtain an indefinite number of operations for the price of one. The presence of the arm of the normally open microswitch S-2 in a location directly ahead of the hole 11 in the line of travel of the card precludes such tampering since if this material is removed to prevent locking, the switch S-2 will remain open and no output signal will be received by the actuating mechanism.

Figure 4C:
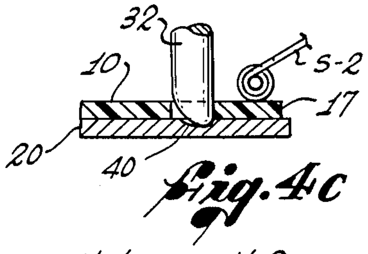

Once the card has been read and/or the operation of the controlled device completed either the original user or the next user may utilize the end 13 of the card to start it on its journey further along the plate 20 and into the bin formed by the remainder of housing 22 simply by sliding it in this direction and/or by pushing it with the leading edge 17 of the next ticket to be used. As seen in FIG. 4*c* the left edge of hole 11 will ride under the rounded portion 38 of plunger 32 just as the leading edge 17 of the card did in order to permit such further motion if a slightly increased force is exerted on the card. However, substantially the forward half of the plunger 32 comes down flush with the surface of detent 40 and the forward portion of the plunger is not rounded. It is therefore impossible to pull the card back out of the slot 21 even though portion 13 is protruding since it is locked in position by the straight downwardly extending forward edge of plunger 32. In order to again operate the device it is thus necessary for the next user to use an additional ticket to push the card 10 on through the card receiving means and into the storage bin.

As noted above, the closing of normally open switch S-2 assures that card material has been pushed at least as far as the location of its switch arm roller. The opening and reclosing of normally closed switch S-1 assures that the card which has been pushed to that first named location has a hole at the correct place so that the locking plunger 32 has seated. The switch S-1 thus functions to preclude the use of a solid card without a hole such as 11 in an effort to "fool" the detector while the use of switch S-2 precludes the use of a slotted card in an effort to "cheat" the detector.

When card 10 has been inserted through slot 21 onto the reading plate 20 to the position where plunger 32 is seated in hole 11, it will occupy the intended or correct reading position for the electronic circuitry shown in FIG. 8 to sense whether or not the card has been properly encoded by the metallic inserts 12 in correct positions. The system may thus in the full sense be said to be a position coded card reading device. At each potential position for placement of insert 12 there is not only the usual binary bit value of presence or absence of the metallic insert, but also there is the encoding value of the correct positioning of the location as a minor portion of the entire area of the card. The probabilities against a counterfeiter accidentally correctly locating a metallic insert 12 are thus considerably greater than the 50-50 chance of either having a metallic or non-metallic overall card the shape of which is easily copied. They are infact increased by an exponential factor as will be discussed below.

This increase in security against counterfeiting is validly attainable, however, only if it is known that the device has not been "fooled" by the insertion of an all metallic card in which the counterfeiter may have been shrewd enough to punch a hole at the location of hole 11. In order to prevent this type of counterfeiting it will be noted in FIGS. 1 and 8 that at least two sensors or reading heads H-1 and H-2 are used at separate locations each of which may be arbitrarily determined in accordance with the position code advantage. These two sensors H-1 and H-2 are connected to control logic circuitry such that an output signal will be provided through the closed microswitches S-1 and S-2 when and only when the sensor H-1 identifies through its associated circuitry the fact that a metallic insert 12 exists above it and simultaneously the sensor H-2 identifies through its associated circuitry that there is no metallic material immediately above it. This identification is achieved, of course, by connecting the sensors in signal producing circuitry which circuitry is in turn connected to logic gate circuitry such that the logic gate provides an output indicative of the correct code on the card (presence of metal at H-1 and absence of metal H-2) when and only when one of the sensors produces a signal indicating the presence of magnetic field modifying metallic material and the other of the sensors does not produce such a signal.

This result is achieved by providing any suitable logic gate circuitry functioning to mechanize the logical relationship "A and not B" which is conventionally written in Boolean logic symbolism as $A \cdot \overline{B}$. Such circuitry in a position coded card assures that the would be counterfeiter is not attempting to cheat the detector circuitry by inserting an all metallic card, since one of the sensors must sense the metal (the insert 12) whereas the other sensor must not sense metal. The use of this logic thus serves as a false code detector and makes the exponential increase in security probabilities discussed above a valid assumption permitting further extensions of position coding. It is only thus that a minimum number of components can be used to provide a very high degree of security thus achieving maximum security at minimum cost and permitting inexpensive mass issuance of reusable tickets.

The detailed functioning of the electronic circuitry of the sensor can best be seen from a consideration of FIGS. 5, 6, 7 and 8. For a permanent magnet of the type shown at 35 in FIG. 5, the lines of approximately equal magnetic potential follow a path having a configuration generally suggested by the dashed lines in FIG. 5 and conventionally considered to flow from the North to the South pole of the magnet. The flux density, B, is measured in lines per square centimeter, the unit being defined as one gauss; the magnetizing force, H, is measured in oersteds, one oersted being defined as 0.4 $\pi$ ampere turns per centimeter. The ratio of B/H is the permeability of the magnetic material. Flux density is increased for a given H in a high permeability path and the permeability of steel is much higher than that of plastic or air. Also, the flux density of a magnet is largest near its ends and especially at sharp corners at the ends which is why the tapered pole piece 36 of soft iron or steel is provided. The tip 36 and insert 12 thus serve to concentrate and intensify the flux density. The tip 36 and insert 12 are formed of soft iron or steel having a low coersive force H and a high saturation density B. Such high saturation density iron has high permeability compared even to the permanent magnet material as well as to air or plastic and therefore serves to concentrate the flux to obtain a high flux density region at the magnetoresistor.

In FIG. 6 there is shown a graph of the resistance, R, in ohms of a two terminal Hall effect magnetoresistor H-0 of the type shown in the circuit of FIG. 7. H-0 is representative of the magnetoresistors used at H-1 and H-2 or other selectedlocations in a given device. The resistance values, R, are plotted as ordinate against values of flux density, B, in gauss as abscissa. It will be noted that at low flux densities the typical resistor has a resistance of 200 ohms which stays substantially constant until a flux density of approximately 2,000 gauss is reached. At this point 50 on the curve, the resistance value begins to increase nonlinearly with increasing flux densities. A point such as 50 on the curve is chosen for the useful operating point to be established by the bias field generated from the tip of permanent magnet 35 so that operation is on a relatively steep portion of the curve. In a preferred embodiment it has been found that an inexpensive Alnico V magnet of modest dimensions with a soft iron tip can readily provide the bias field of approximately 2,000 or 3,000 gauss which is desirable for Siemens type magnetoresistors as identified in the article referenced above.

Bringing a piece of high permeability material such as the steel or soft iron insert 12 in card 10 near the sensor will further intensify the flux linking through it and cause the operating point to move along the characteristic curve of the magnetoresistor from point 50 to point 51. This in turn will change the resistance value of the magnetoresistor. This change in flux density when the metal insert 12 is placed above the magnetoresistor results from the fact that in its absence only a small part of the flux of the permanent magnet passes through the magnetoresistor while a considerable percentage of the flux passes as stray flux through leakage paths not including the magnetoresistor. The presence of the metal insert 12 above the magnetoresistor causes the flux from the permanent magnet to be concentrated through the magnetoresistor as well as through the tip 36. That is to say when the metal insert 12 is present a better path for the flux is provided through it and there is therefore less leakage flux or more flux concentrated through the magnetoresistor. This increase in flux density moves the operating point from a point such as 50 corresponding to the resistance value of about 200 ohms to a point such as 51 haviing a resistance value of over 300 ohms.

Soft iron suitable for insert 12 has low H and high B and very low remnant magnetization so that it is nearly demagnetized when away from the permanent magnet. The card when carried on the user's person will thus not attract or affect other magnetizable materials or objects. The proximity of a high field brings the soft iron to near saturation the value of which depends upon the demagnetizing factors due to shape. Demagnetizing is least when the length to cross sectional area is greatest and the inherent reluctance (H/B) between the induced poles at the ends is high. Thus the soft iron or other field intensifier suitable for use as insert 12 must have high saturation density, high permeability, and low cross sectional area relative to length. In one exemplary device a steel insert 12 had surface dimensions of ¼ inch by ⅛ inch with a thickness of only about 10 mils. When a magnetoresistor sensor is placed in close proximity to such a small piece of steel or soft iron and is located between it and the magnetic bias field pole piece, the flux through the magnetoresistor can be greatly increased so that its resistance change can be reliably and economically detected by commercially available inexpensive circuit components.

For example, as shown in FIG. 7 a silicon transistor T-1(such as a 2N1711 obtainable from Motorola Inc. and others)may be cut off or turned on by a change from 200 to 300 ohms in resistance of the magnetoresistor corresponding roughly to a change of from 2,000 to 3,000 gauss. In this elementary exemplary configuration, the magnetoresistor H-O is connected in series with a fixed resistor R-1 of 1,800 ohm value and the series combination is connected between a 5 volt B+ power supply and ground. The junction point between R-1 and H-O is connected to the base electrode of the transistor. A 5 volt B+ source is connected through a 1,000 ohm resistor R-2 to the collector of the transistor and the emitter of the transistor is connected to ground. Output may be taken at terminal 52. It will be observed that the series connected resistors R-1 and H-O act as a voltage divider and that the voltage applied to the base of transistor T-1 will be 0.5 volt when H-O has a value of 200 ohms and will be 0.71 volt when H-O has a value of 300 ohms. Transistors and other solid state devices are reaidly available having base electrode bias cut-off points between these voltage values so that at 0.5 volts the transistor is cut off (indicating a lower resistance value corresponding to absence of the metal insert 12) whereas at 0.71 volts the transistor is turned on indicating the presence of themetal insert 12 and the resulting higher resistance value for H-0. At the output terminal 52 the cut-off state of the transistor results in a voltage level which is deemed "high" or approximately 5 volts representing the absence of the metal insert 12 whereas when the presence of the metal insert 12 turns the transistor on the voltage at output terminal 52 will drop to a relatively low value due to the voltage divider action of resistor R-2 and the collector emitter circuit of the transistor. The elementary circuit shown thus provides a simple means of indicating the presence of a metal insert 12 at a specified location by a low voltage at 52 and conversely indicating the absence of 12 by a high voltage at 52. Commercially available logic circuitry normally indicates one preselected logic state by a voltage greater than +2.4 volts and the opposite binary logical state by a voltage level of less than 0.8 volts. Either a 1 or a 0 may be arbitrarily selected to be represented by the high voltage and the other is then represented by a low voltage as is well known. The circuitry is thus shown to be suitable for use with standard commercially available logic gates such as the TTL Series 7400 gates available from Texas Instruments Inc. of Dallas, Tex. Such logic gate chips may be used in the circuitry indicated in detail in FIG. 8. Of course it will be understood that transistor T-1 may be a junction transistor, a field effect transistor, an MOS device, or any solid state device the conductivity of which can be controlled by an applied bias voltage.

In normal Boolean logic terms a card such as shown in FIGS. 1 and 8 having a piece of iron 12 present at a first location above hole 24 which may be designated location A and having no iron present at a second location above hole 23 which location may be designated B is commonly designated $A \cdot \overline{B}$ for the true state where A indicates the presence of detected iron, $\overline{B}$ means the absence of iron and the · means a logical "and" function. A piece of material held near the magnets can generate the correct code if and only if soft iron is present near the correct sensor and not present near the sensor placed at B for detecting false codes. As will be seen below more complex codes can be generated by the statement of more complex logic functions implemented by logic circuitry in a similar known fashion. Alternatively, the simple circuit of FIG. 7 can itself be used to read the binary bit value of one position in a card having a plurality of encodeable positions arranged in the usual row and column matrix. The output at terminal 52 in each of these circuits (one for each position) can then be fed to a parallel data bus or can be supplied to a parallel to serial converter for transmission to any desired use. If desired the outputs from terminals such as 52 may first be passed through an inverter since as the circuit stands the presence of a piece of steel 12 results in a low output voltage which is often conventionally taken as binary 0 whereas the absence of steel 12 results in a high output voltage which is often conventionally taken as a logical 1. In order to reverse this relationship so that the presence of a piece of steel 12 indicates a binary 1 and its absence a binary 0, it is only necessary that the output of terminal 52 be passed through a logical level inverter.

In the system of FIG. 8 an inverter is shown schematically at 64 which changes a "low" output of 61 to a "high" and vice versa. The inverted signal thus indicates the presence of insert 12 at position A by a high voltage. In practice any convenient logic inverter such as a properly connected AND gate may be used if desired. The signal input to the inverter 64 is derived from the collector of transistor 61 which itself is connected in a signal producing sensing circuit of the type shown in FIG. 5. Thus, the emitter of transistor 61 is connected to ground and its collector is connected through a resistor 62 to a 5 volt source. The base electrode of the transistor is connected to the junction port of a resistor 63 and the magnetoresistor H-1 mounted on bias magnet 35*a* under the hole 24 in reading plate 20. The other side of the magnetoresistor is connected to ground and the other end of resistor 63 is connected to the 5 volt source. This circuit configuration operates in the manner of the circuit of FIG. 5 to produce a low voltage at the collector of transistor 61 when the metal insert 12 is present at position A above magnetoresistor H-1 and a high voltage when it is absent. Inverter 64 reverses these polarities as noted.

A similar transistor 65 is connected in a similar sensing circuit including the magnetoresistor sensor H-2 positioned beneath hole 23 in plate 20 to provide the B input to the logical AND gate 67 directly from the collector of transistor 65. Magnetoresistor H-2 is connected through a resistor 68 to a 5 volt source. The collector of transistor 65 is connected through a resistor 69 to the 5 volt source so that the transistor 65 like the transistor 61 functions in the manner of the circuit illustrated in FIG. 7 to provide a high output at its collector when no metal is present above the magnetoresistor H-2 and a low output when metal is present. This output from the collector of transistor 65 is supplied to provide the other input to a conventional AND gate 67 which has a high output when and only when both of its inputs are high. As has been noted, a high output directly from transistor 65 indicates no metal at position B (i.e., $\overline{B}$); a high output from inverter 64 derived from transitor 61 indicates metal present at position A (i.e., A). The AND gate 67 with the inputs to it as shown in FIG. 8 thus mechanizes the relationship $A \cdot \overline{B}$.

The output of AND gate 67 is connected through switches S-1 and S-2 to a differentiating circuit consisting of series connected capacitor 70 and grounded resistor 71. It could of course be directly connected to an actuating device. The one shot circuit shown is triggered by a positive edge and serves to operate an actuator once only each time a card is inserted. Timing of the one shot or delay multivibrator(an SE555, for example) is determined by adding a resistor and capacitor as is well known.

Of course, any other logic arrangement can be used which provides the equivalent of the AND gate function schematically indicated by the gate 67. This AND gate function is such that the gate 67 has a high output when and only when both of its input terminals are receiving a high level input signal. Due to the use of inverter 64 this circuit state exists when and only when the first sensor circuit transistor 61 produces a signal which is a low voltage and the second sensor circuit transistor 65 does not produce such a low voltage, i.e., when it does produce a high voltage. This state of circuit functioning can only result from the presence of the metal insert 12 above hole 24 and the absence of metal above hole 23.

The voltage levels produced by a card which has been locked in position on the reading plate are steady state voltages. The capacitor 70 and resistor 71 forming the differentiating circuit are provided in order to provide a pulse output when this steady state output first appears from gate 67 through closed switches S-1 and S-2 when the card is locked in position. The pulse resulting from differentiating the leading edge of this steady state voltage is applied to the one shot multivibrator 72 the output of which is applied to the coil 73 of a latching relay LR-1 the other end of which is connected to a 5 volt power supply. It is of course understood that the one shot multivibrator has its own power supply and that the coil 73 is connected to its low or grounding output so that when it is rendered conductive current will be drawn from the 5 volt source through the coil 73 of the latching relay to close the relay and actuate the utilization circuit 75 which is connected to a source 76 of 110 volt power. The high output could be used if the other end of the relay coil were connected to ground.

The utilization circuit may be a washer, a dryer, a gate to be operated, a vending apparatus, a credit card reading device, or any desired similar apparatus. Preferably a timer 77 is also connected across the 110 volt supply so that after the pulse resulting from insertion of a correctly coded card has actuated the one shot to close the relay the timer will permit the controlled apparatus to operate through its predetermined cycle and will then release the latching relay to turn off the controlled apparatus or utilization circuit 75. The sensing and logic gate circuits will retain the voltage levels discussed above as long as the card 10 is present on the reading plate. When the insertion of the next user's card pushes the card shown in FIG. 8 forward off of the reading position, the logic circuits are reset automatically by the removal of the metal insert 12 to their quiesent state and are ready to again read the code of the next ticket. Also, switch S-1 is opened by forward motion of the card permitting capacitor 70 to discharge through resistors 71 and 84.

It should in particular be pointed out that utilization circuit 75 may in fact also be operated from a low voltage source as well as from a 110 volt source. In particular this utilization circuit may be the parallel to serial converter of the above suggested arrangement wherein a plurality of circuits of the type shown in FIG. 7 are provided, one for each bit of binary information to be encoded on the rearward portion of the card 10 or on another associated card to be read by a separate reader. Such binary bit circuits can, for example, be provided in association with holes such as the holes 25 and 26 shown in FIG. 3 at the other end of the reading plate 20.

Alternatively the holes 25 and 26 may be used to accomodate a fixed logic circuit having four inputs rather than two inputs the logic diagram for which is shown in FIG. 9. It is assumed that inputs A, B, C and D are respectively associated with sensors positioned under the holes 24, 23, 26 and 25. The sensing circuits associated with each of these reading positions are each of the type shown in FIG. 7 and are connected to the gate circuitry in the same manner as is illustrated in FIG. 8. However, the simple AND gate 67 of FIG. 8 is replaced by the logic circuitry shown in FIG. 9. Inputs A and B are provided to an AND gate 80 which has a high output only when both of its inputs are high. Inputs C and D are provided to an OR gate 81 which has a high output when either of its inputs C or D are high. The inverter 82 is used to change the logic function $C + D$ to the function $\overline{C + D}$. The output of inverter 82 is provided to a second AND gate 83 which has the output of gate 80 as its other input. The output of gate 83 is then the function described in FIG. 9 as $A \cdot B \cdot (\overline{C + D})$. This logic circuit, at the nominal expense of a few extra gates, provides a considerably more complex coding pattern which may be necessary and warranted for applications requiring a greater degree of security. It will of course be recognized that this logic function may be realized with conventional logic NAND gates or NOR or any combination that provides the required logic function. In the example given, in order for the gate 83 (the output of which is applied through switches S-1 and S-2 to trip the utilization circuit) to have an output, it is necessary that metal inserts be present at reading stations A and B and not be present at reading stations C or D. The location of these reading stations cam be varied or selected at will from the positions available in the card.

It is economical to use the more simple coding to suit a given purpose. The simplest arrangement which is that shown in FIG. 8 and which is included as a minimal element of any configuration, requires the mechanization of the logical relationship A and not B and is sufficient in connection with low cost services to prevent economically feasible use of counterfeit cards which would have to have metal in a precisely preselected area and only in that area. The use of a locating means such as the locking plunger to operate a microswitch adds the logical dimension that the card must be placed fully into the slot and onto the reading plate in precisely the correct position. However, if even greater security is required then the correct choice would require the positioning of two or more pieces of metal and the use of circuitry such as that shown in FIG. 9.

In general if N pieces of metal of small dimension are positioned in the correct locations more than $2^N$ codes become available because each piece of metal placed in the coded card (or absent therefrom) has a position choice in a two coordinate system over the area of the card. If changeable codes are provided by a card the area of which is such as to provide a total of T possible positions in which M positions may have metal 12 present and P positions may not have so that M : P = T and if furthermore N sensors are used for the M positions and Q sensors are used for the P positions (where N is less than M and Q is less than P) then the probability against random or chance duplication of the code is the product of the total possible permutations of M things taken N at a time multiplied by the total possible permutations of P things taken Q at a time. For example, in a 1 inch by 3 inch plastic card using ⅛ inch square sensors of a commercially available type coacting with ⅛ × ¼ inch steel inserts there are 3 × 8 × 4 or 96 areas of ⅛ by ¼ inch dimensions in each of which a sensor may be associated so that T is here 96. Thus M can be 48 and P can be 48. If only 3 sensors are used for each function, (so that N and Q are both 3) the probability against operating the device accidentally is 48 × 47 × 46 divided by 1 × 2 × 3 times 48 × 47 × 46 divided by 1 × 2 × 3. This equals 17,296 × 17,296 or nearly 300 million to one, a figure which increases rapidly as N and Q increase. As noted above, the degree of complexity used in each case should be suited to the needs of the particular application. For any application the device provides maximum security at minimum cost.

What we claim is:

1. In a Hall effect encoded card detector, the improvement comprising:

a. a transistor circuit having a two terminal magnetoresistor connected in a bias circuit thereof to control the state of conductivity of said transistor, said bias circuit being such that said transistor is rendered conductive at one resistance value of said magnetoresistor and is rendered nonconductive at another resistance value of said magnetoresistor;

b. means positioned to provide a magnetic bias field of fixed magnitude to said magnetoresistor;

c. encoded card receiving plate means having means to position said magnetoresistor adjacent a predetermined position on said plate means; and d. said plate means further having means to position an encoded card with respect to said plate means so as to position a card encoding piece of unmagnetized but high permeability material embedded in said card adjacent said magnetoresistor predetermined position to thereby modify the bias field through said magnetoresistor and thus control the state of conductivity of said transistor responsively to the presence or absence of said piece of high permeability material in said card to indicate said presence or absence.

2. In a position coded card detector of the type having card receiving means for positioning a coded key card to sense a code defined by variation of a characteristic of the material of said card as a function of position on said card, the improvement comprising:

a. first and second sensors each responsive to a predetermined value of said material characteristic and having predetermined fixed sensing positions with respect to said card receiving means and to each other, said first and second sensors being so positioned with respect to said card receiving means as to respond to one value of said material characteristic at first and second predetermined areas of said card when said card is correctly positioned in said receiving means;

b. first and second circuit means each respectively operatively connected in circuit with one of said sensors to produce a signal only in response to one value of said material characteristic; and c. logic gate circuit means connected to receive the outputs of said first and second signal producing circuit means to provide an output signal indicative of the correct code on said card when and only when the first of said sensors produces a signal indicating said one value of said material characteristic and the second of said sensors does not produce such a signal.

3. Apparatus as in claim 1 and further including plunger means to lock said card in said receivig means when said card is positioned at a predetermined correct reading position therein.

4. Apparatus as in claim 3 wherein said locking plunger means is spring biased and shaped to have an edge facing in the entry direction of said card which edge is tapered to permit camming of said plunger by said card and to have an edge facing in the opposite direction which is perpendicular to the major plane surface of said card and said receiving means to preclude such camming and thus to permit continued passage of said card to said receiving means in any position of said plunger but to prevent withdrawal of said card from said receiving means when said locking plunger is seated in said hole.

5. Apparatus as in claim 3 and further including a first microswitch means mounted to be actuated by said plunger means to operate a first enabling circuit element to pass the output signal of said logic gate circuit when said card is locked in said receiving means.

6. Apparatus as in claim 5 and further including a second microswitch means mounted to be actuated by the presence of the material of said card at a second predetermined point ahead of and aligned with said first predetermined point along the direction of travel of said hole when said card is inserted in said receiving means to operate a second enabling circuit element connected in series with said first enabling circuit element.

7. A Hall effect position coded card detector for use with a coded key card, said detector comprising:

a. card receiving means;

b. first and second magnetoresistive sensors having predetermined fixed sensing positions with respect to said card receiving means and to each other, each of said sensors including a two terminal magnetoresistor and permanent magnet means positioned to establish a constant magnetic bias field across said magnetoresistor;

c. said first and second sensors being so positioned with respect to said card receiving means as to sense the presence or absence of magnetic field modifying material at first and second predetermined areas of said card when said card is correctly positioned in said receiving means, said card areas and said sensing positions then being located in magnetic field coacting relationship to each other;

d. first and second circuit means each respectively operatively connected in circuit with one of said magnetoresistors to produce a signal indicative of whether or not the magnetic bias field through its associated magnetoresistor has or has not been modified; and e. logic gate circuit means connected to receive the outputs of said first and second signal producing circuit means to provide an output signal to an output circuit when and only when the first of said sensors produces a signal indicating the presence of field modifying material and the second of said sensors does not produce such a signal.

8. Apparatus as in claim 7 and further including plunger means to lock said card in said receiving means when said card is correctly positioned therein.

9. Apparatus as in claim 8 and further including means mounting a microswitch for actuation by motion of said locking plunger and said microswitch being operatively connected to receive and when closed to pass said output signal to said output circuit.

10. A Hall effect position coded card detector having card receiving means for correctly positioning a coded key card to sense a code defined by the presence of a high magnetic permeability piece of metal at at least one predetermined position in a card primarily made of non-metallic material, said detector further comprising:

a. a plurality of magnetoresistive sensors having predetermined fixed sensing positions with respect to said card receiving means and to each other, each of said sensors including a two terminal magnetoresistor and permanent magnet means positioned to establish a constant magnetic bias field across said magnetoresistor;

b. each of said sensors being so positioned with respect to said card receiving means that the presence of said high magnetic permeability piece of metal at one said predetermined position in said card will concentrate said magnetic bias field and thereby increase its intensity through said magnetoresistor when said card is correctly positioned in said receiving means, said predetermined positions in said card and said sensing positions then being located in magnetic field coacting relationship to each other;

c. a corresponding plurality of circuit means each respectively operatively connected in circuit with one of said magnetoresistors to produce a signal responsively to a change in the resistance value of said magnetoresistor to indicate that the magnetic bias field through its associated magnetoresistor has been changed by the presence of a piece of high magnetic permeability material in said card; and d. logic gate circuit means connected to receive the outputs of said plurality of signal producing circuit means to provide an output signal indicative of the correct code on said card when and only when at least a first of said sensors produces a signal indicating the presence of said high magnetic permeability material at said predetermined position in said card and at least a second of said sensors does not produce such a signal, said second sensor being positioned with respect to said card receiving means to function as a false code detector in order to preclude actuation of said detector circuitry by a card incorrectly encoded or composed entirely of said high magnetic permeability metal.

11. A detector as in claim 10 and further including spring biased plunger locking means positioned to coact with a hole in said card and with said receiving means when said card is correctly positioned therein, said plunger locking means being positioned off of the center line of said card receiving means to preclude locking said card in said receiving means when said card is inserted therein with incorrect orientation.

12. A detector as in claim 11 and further including a first microswitch positioned to be actuated by said locking plunger and a second microswitch positioned to be actuated by the material of said card, said microswitches being so connected that actuation of both said first and second microswitches closes an enabling circuit to apply the output of said logic gate circuit to an output circuit.

13. Apparatus as in claim 12 wherein said output circuit comprises a differentiator connected to receive the output of said logic gate circuit through said enabling circuit, the output of said differentiator being connected to a one shot multivibrator which is in turn connected to actuate a switching device which, when closed, is connected to supply power to a utilization circuit.

14. Apparatus as in claim 10 wherein said plurality of magnetoresistor sensors and said corresponding plurality of signal producing circuit means includes N magnetoresistors each positioned in said of M available positions to detect the presence of said high permeability magnetic material and further includes Q magnetoresistors positioned in one of P available positions to detect the absence of said high permeability material, and wherein said logic gate circuit means mechanizes a complex logic function having P + Q inputs and one output.

15. Apparatus as in claim 14 wherein a false code is indicated when any one of said Q magnetoresistors sense the presence of magnetic field concentrating material, and means coacting with said logic circuit to preclude actuation of a utilization circuit when said false code is indicated.

* * * * *